Nov. 24, 1970    V. C. HED ET AL    3,543,304
GOLF YARDAGE COUNTERS

Filed Sept. 23, 1968    2 Sheets-Sheet 1

Nov. 24, 1970  V. C. HED ET AL  3,543,304

GOLF YARDAGE COUNTERS

Filed Sept. 23, 1968  2 Sheets-Sheet 2

United States Patent Office 3,543,304
Patented Nov. 24, 1970

3,543,304
GOLF YARDAGE COUNTERS
Virgil C. Hed, 5721 Hansen Road, Edina, Minn. 55436, and James A. Makie, 200 Rice Creek Terrace NE., Minneapolis, Minn. 55432
Filed Sept. 23, 1968, Ser. No. 761,617
Int. Cl. G01p *3/02;* G01b *3/12*
U.S. Cl. 235—95
9 Claims

ABSTRACT OF THE DISCLOSURE

A rotating counting device capable of counting shaft revolutions or indicating linear displacement of rotating wheels consisting of: an internal toothed gear, an external toothed gear with less teeth and capable of rotating within said internal toothed gear, a means for determining angular displacement between the two said gears and a series of scales interchangeably attached to the internal toothed gear calibrated to indicate linear distance traversed by different diameter wheels.

---

This invention relates to rotation counting devices in general, and more particularly to a golf cart mounted yardage counter based on counting the rotations of one of the cart wheels as the cart is pulled.

In the game of golf, knowledge of distance is very important. Knowing how far one is from the tee is very helpful in selecting a club for the next shot. Also, knowing the length of his drives will add to the golfers' enjoyment of the game.

Several patents have been issued on golf cart mounted yardage counters. Most of the problems inherent in these devices are caused by overly complex mechanisms. The wheel of a golf cart undergoes relatively high shock loads when pulled around the average golf course. Complex mechanisms will not operate reliably under these conditions. Also, complex mechanisms force the selling price above what most golfers are willing to pay.

Therefore, it is the general object of this invention to provide a simple mechanism for a rotation counting device suitable for low cost manufacturing methods such as plastic injection molding.

It is a further general object of this invention to provide a mechanism for counting rotations by utilizing two gears with different numbers of teeth. One of the gears is an internal toothed gear and the other an external toothed gear. One of these gears is fixed to a horizontal shaft and drives the other gear. Gravity holds the driven gear in mesh with the driving gear. The angular difference rotated by the two gears indicates the number of rotations of the shaft.

It is a further object of this invention to provide a rotation counting mechanism which does not require a shaft extending through the case of the counter, thus permitting effective sealing of the counter.

It is a further object of this invention to provide a rotation counting mechanism suitable for use as a golf yardage counter.

Finally, it is an object of this invention to provide a yardage counter which is easily removed from a golf cart for reading and resetting.

The following is a description of one version of a golf yardage counter utilizing the principles of this invention. It should be understood that these principles apply to rotation counters generally. It should also be understood that there are several other versions of this device, other than the one described, that will be readily apparent to anyone skilled in the art.

Figure 2:
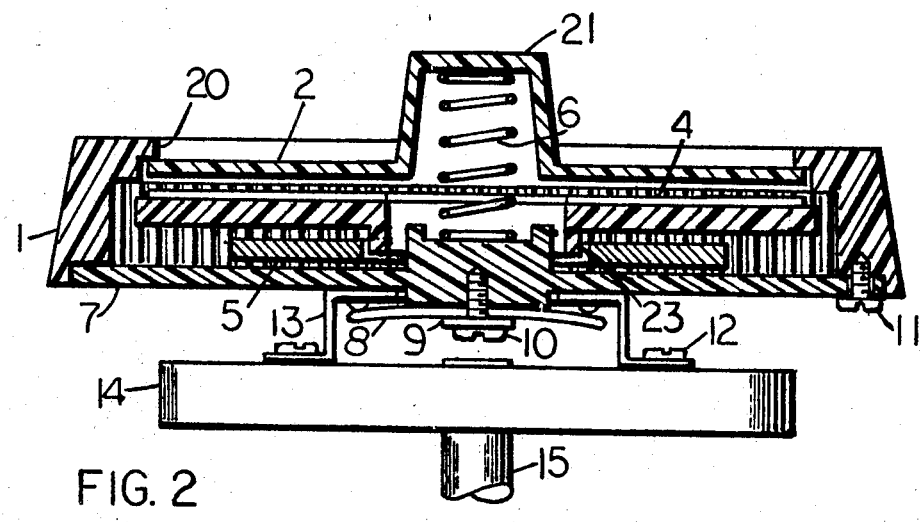
FIG. 2 is a cross-sectional side view of the yardage counter and mounting bracket.
Figure 3:
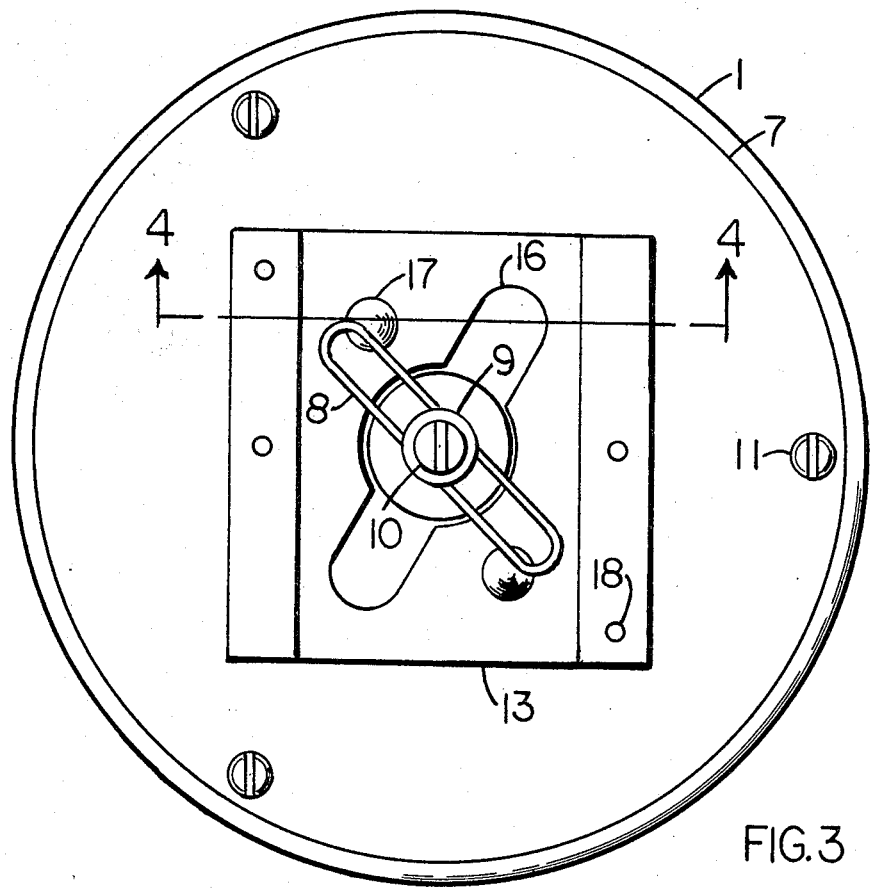
FIG. 3 is a view from the back of the yardage counter showing the counter in the locked position on the mounting bracket.
Figure 4:
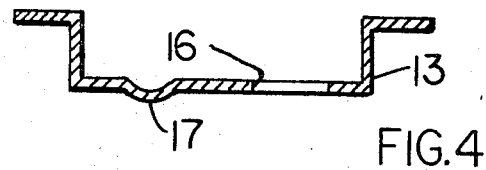
FIG. 4 is a cross-sectional view of the mounting bracket taken on line 4—4 of FIG. 3.

With reference to FIG. 2, the mounting bracket 13 will normally be fixed permanently to the center of the hub 14 on one of the golf cart wheels. In use, the yardage counter will be fastened to the mounting bracket while measuring distance and then removed for reading and resetting. FIG. 3 shows the mounting bracket 13 more clearly. The bracket, which is steel, has mounting holes 18 for screws 12 which hold the bracket to the cart wheel hub. This bracket also has an attachment hole 16 which is a composite of a round hole and an elongated hole. The elongated portion of this hole is positioned diagonally on the mounting bracket 13. Two dimples 17 are located in opposite corners on the other diagonal of the bracket. FIG. 2 and FIG. 3 show that a spring wire clip 8 is fastened to a circular boss on the backplate 7 by screw 10 and washer 9. To attach the yardage counter to the mounting bracket which is permanently fastened to the cart wheel, the counter is first held so that the spring clip 8 is aligned with the attachment hole 16 of the mounting bracket 13. The spring wire clip is then inserted in the attachment hole and the counter is rotated about 90 degrees. As the counter is rotated, the spring wire clip 8 rides up on the dimples 17 deflecting the clip and pulling the backplate 7 tightly to the mounting bracket 13. The yardage counter is turned to the position shown in FIG. 3. Here the spring wire clip 8 has gone slightly over the top of the dimples and rests against the sides of the mounting bracket. In this position the yardage counter is held firmly in place. It is apparent that the counter can be removed from the cart by simply reversing this procedure.

Figure 1:
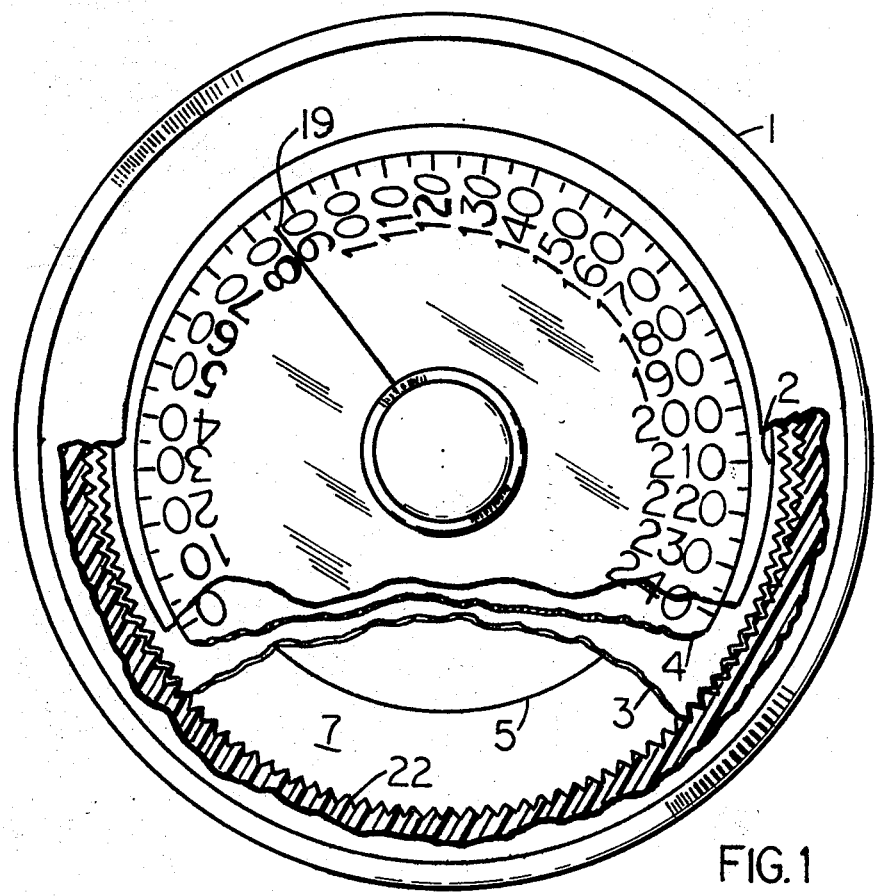
FIG. 1 is a partially broken away, partially cross-sectioned front view of the yardage counter.

Molded as part of the housing 1 is an internal toothed gear 22 with 301 teeth. The housing is fastened to the backplate 7 by three screws 11. The housing has a lip 20 for constraining the window 2. The window is held against this lip by a compression spring 6. This spring provides friction between the window and the lip 20. This friction is sufficient to hold the window in place except when deliberately turned by the golfer for resetting. The window 2 and knob 21 are molded in one piece of clear plastic. The housing and backplate are also plastic. The window has a hairline 19 for reading the scale 4. The scale is fastened to an external toothed gear 3 which has 300 teeth. The pitch diameter of the external toothed gear is about three inches which is about 0.060 inch less than the pitch diameter of the internal toothed gear 22. The external toothed gear is placed in the internal toothed gear as shown in FIG. 1. Gravity keeps the teeth on the lower side of the two gears meshed while there is clearance between the teeth on the upper side. When the golf cart is pulled, the housing 1, backplate 7 and window 2 rotate at the same rate as the golf cart wheel. Since the internal toothed gear 22 is part of the housing, it will also rotate at the same rate as the golf cart wheel. As the internal toothed gear rotates, gravity keeps the external toothed gear meshed with it on the lower side. Because the external toothed gear 3 has one less tooth than the internal toothed gear, it rotates at a slightly faster rate than the internal toothed gear. For each rotation of the internal toothed gear, the external toothed gear turns one rotation plus the angle subtended by one tooth of the external toothed gear. The scale which is attached to the external toothed gear is marked in yards corresponding to the angular displacement between the two gears. A different scale is used for each golf cart wheel size. The hairline 19 on the window 2 provides a convenient means for determining the angular displacement of the two gears. The hairline is first set to the zero position on the scale. As the cart is pulled, the hairline will remain fixed relative to the internal toothed gear. The scale on the external toothed gear will therefore move relative to the hairline and indicate the distance that the cart has moved.

For proper operation of the yardage counter it is important that the two gears stay meshed on their lower sides as shown in FIG. 1. If the golf cart were pulled over smooth surfaces only, a light-weight external toothed gear would be satisfactory. However, the average golf course is bumpy enough so that the gear must be weighted. It has been found that less weight is required if the weight is allowed a limited amount of freedom. The weight 5 is shown in FIG. 1 and FIG. 2. It is a washer which is constrained by a shoulder 23 on the external toothed gear 3. The inside diameter of the washer is about 0.125 inch greater than the diameter of the shoulder. This provides a limited amount of freedom of the weight relative to the external toothed gear.

To use the yardage counter, the golfer removes the counter from the cart and turns the knob so that the hairline is over the zero position on the scale. The counter is then attached to the mounting bracket on the golf cart wheel. After the cart has been pulled the distance to be measured, the counter is removed from the cart for reading.

What is claimed is:

1. A rotation counting device for mounting on a rotating element consisting of: a base for mounting on said rotating element; an internal toothed gear; an external toothed gear with less teeth than said internal toothed gear, one of the two said gears fastened to said base with the other gear dependent upon gravity to remain in mesh with it; a means for determining the angular displacement between the two gears as said rotating element turns.

2. A rotation counting device according to claim 1 where the internal toothed gear is positioned on said base; said external toothed gear is positioned loosely in said internal toothed gear; a scale which is marked to indicate said shaft rotations is being fastened to said external toothed gear; a rotatable window concentric with said internal toothed gear contains a hairline for reading said scale.

3. A shaft rotation counter according to claim 2 whereby the base is mounted to a golf cart wheel and the scale is marked to read distance that the cart is moved.

4. A shaft rotation counter according to claim 3 whereby a weight is constrained by the external toothed gear in such a manner as to allow limited freedom of said weight.

5. A shaft rotation counter according to claim 3 whereby a series of scales may be interchangeably attached to the external toothed gear, each scale of said series being marked to show distance moved by a different sized golf cart wheel.

6. A rotation counting device according to claim 1 where the external toothed gear is positioned on said base; said internal toothed gear is positioned loosely over said external toothed gear; a scale which is marked to indicate said shaft rotations is fastened to said internal toothed gear; a rotatable window concentric with said internal toothed gear contains a hairline for reading said scale.

7. A shaft rotation counter according to claim 6 whereby the base is mounted to a golf cart wheel and the scale is marked to read distance that the cart is moved.

8. A shaft rotation counter according to claim 7 whereby a weight is constrained by the internal toothed gear in such a manner as to allow limited freedom of said weight.

9. A shaft rotation counter according to claim 7 whereby a series of scales may be interchangeably attached to the internal toothed gear, each scale of said series being marked to show distance moved by a different sized golf cart wheel.

References Cited
UNITED STATES PATENTS

| | | | |
|---|---|---|---|
| 3,357,636 | 12/1967 | Ferro | 235—95 |
| 3,441,209 | 4/1969 | Farman | 235—95 |
| 3,458,128 | 7/1969 | Tillman | 235—95 |

LEONARD H. GERIN, Primary Examiner

U.S. Cl. X.R.

74—13, 413